J. M. CUSTENBORDER.
TRACTOR STEERING DEVICE.
APPLICATION FILED APR. 22, 1918.
1,348,630.
Patented Aug. 3, 1920.
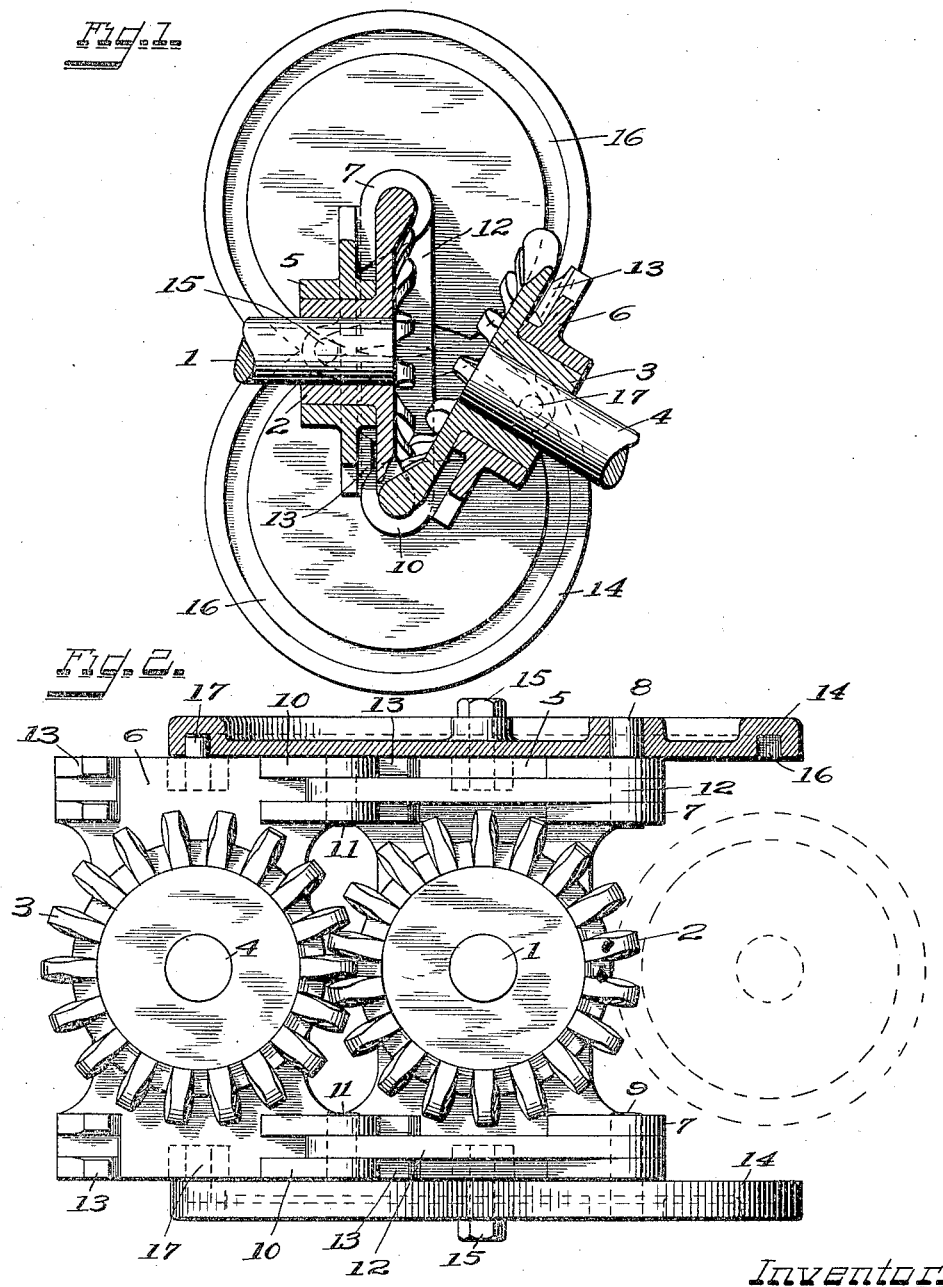
Inventor
John M. Custenborder
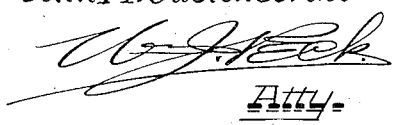
Atty.

UNITED STATES PATENT OFFICE.

JOHN M. CUSTENBORDER, OF MACKINAW, ILLINOIS.

TRACTOR-STEERING DEVICE.

1,348,630.

Specification of Letters Patent.  Patented Aug. 3, 1920.

Application filed April 22, 1918. Serial No. 229,992.

*To all whom it may concern:*

Be it known that I, JOHN M. CUSTENBORDER, a citizen of the United States, residing at Mackinaw, in the county of Tazewell and State of Illinois, have invented certain new and useful Improvements in Tractor-Steering Devices, of which the following is a full, clear, and exact description, reference being had to the accompanying drawings, forming part of this specification.

My invention relates more particularly to devices for use in connection with farm tractors wherein it is desired to steer the tractor from a trailing vehicle such as a binder, the operator riding on the trailing vehicle to control its functions, while having control of the steering of the tractor, though it is apparent that the structure is capable of advantageous use for a variety of other purposes such as for the transmission of power from a truck or tractor to a trailing vehicle when the trailing vehicle is provided with means whereby the power from the truck may be delivered to its wheels, and other uses which will appear to those skilled in the art to which my invention relates.

One object of my invention is the provision and arrangement of the requisite parts whereby the driven shaft may be caused to assume any angular relation to the driving shaft in a given plane, this angular relation extending from parallel on one side of the driving shaft through the full sweep of a circle to a position parallel to the drive shaft on the opposite side thereof.

Another object of my invention is the provision of means whereby the driving elements employed may be maintained at all times in proper driving relation with each other.

Another object of my invention is to so arrange and construct the parts that the linkage which connects the supporting members is at all times supported at or near its extremities thereby affording a rigid and substantial structure.

Other objects of my invention will appear and be described throughout the specification.

The novelty of my invention will be more fully hereinafter set forth and specifically pointed out in the claims.

In the accompanying drawing, Figure 1 is a sectional plan view of one form of device showing the embodiment of my invention therein.

Fig. 2 is an end view partly in section, showing the parts of the device in proper position when the driven shaft is in a position parallel to the driving shaft.

The same numerals of reference are used to indicate identical parts in all the figures.

In that form of device shown in the drawings 1 represents a suitable driving shaft carrying a specially formed driving element 2 engaging with a similar element 3, mounted on a driven shaft 4.

A housing 5 is preferably mounted on the hub of the driving element 2, and a duplicate housing 6 is mounted on the hub of the driven element 3.

The housing 5 is provided with lugs 7 through which pivot pins 8 and 9 are passed, the axis of these pins being coincident with the normal speed or pitch point of the driving element 2, the housing 6 being provided with similar lugs 10 through which pivot pins 11 are passed, the latter being arranged with their axes coincident to the normal or pitch point of the driven element 3. Links 12 connect the lugs 7 with the lugs 10, thereby connecting the housings 5 and 6, somewhat after the manner of a swinging door hinge.

Each of the housings 5 and 6 is provided with a pair of lugs 13 which are slotted as shown and are adapted to engage the links 12 adjacent the ends thereof in such manner that when the parts are in the position shown in Fig. 1 the lugs 13 support the links 12 at their ends opposite to the lugs 7 whereby any strains transmitted from the housing 5 to the housing 6 are transmitted directly from the lugs 13 to the lugs 10 instead of from the lugs 7 to the lugs 10 through the medium of the links 12 as would be the case were the lugs 13 not provided.

The driving and driven elements 2 and 3 are preferably gear-like in form, the teeth being so shaped that the elements 2 and 3 may properly engage each other regardless of the angular relation existing between the elements 2 and 3, the tooth form partaking somewhat of the nature of a combination of spur, bevel, and crown gear.

To prevent movement of the housing 6 in a direction which would cause the links 12 to turn on their pivotal connection at each of their ends simultaneously, restrictive means are provided whereby the housing 6, while being free to be operated on either pivotal connection of the links 12 is prevented from operating on both of these connections, and to this end the housing 5 is provided with guide-plates 14 which are secured to the housing 5 as by means of the cap-screws 15, the pivot pins 8 and 9 serving as additional means to assist the cap-screws 15 in maintaining the guide-plates 14 in proper position.

Each guide-plate 14 is circularly grooved as at 16 and guide-pins 17 which are carried by the housing 6 engage the grooves 16 and travel therein as the housing 6 is angled with relation to the housing 5, the construction being such that when the housing 6 occupies a position in alinement with the housing 5, the pins 17 will lie in the intersection of the grooves 16 so that a movement of the housing 6 in either direction will cause the pins 17 to travel into one or the other of the circular grooves 16 thereby confining the movement of the housing 6 around the pivot pins 8 and 9 or 11 and 11 and preventing such a movement of the housing 6 as would cause the links 12 to operate on the pivot pins 8—9 and 11—11 simultaneously with the result of disengaging the driving elements 2 and 3 and interrupting the driving connection between the shafts 1 and 4.

It is frequently advisable to provide means whereby the final driven shaft may be capable of assuming an angular position in any plane with relation to the driving shaft in which case two mechanisms such as previously described are employed and so mounted that they bear a right angular relation to each other, the axis of the pivot pins of one mechanism being at right angle to the axis of the pivot pins of the other mechanism, the housing of the second mechanism corresponding to the housing 5 being secured to the housing 6 of the first mechanism, the combination of the movements of both mechanisms permitting the finally driven shaft to operate in any position desired with relation to the primary shaft.

It is to be observed that the angling of the driven shaft with relation to the drive shaft neither adds nor subtracts motion to or from the driving shaft for the reason that any angled position assumed by the driven shaft is generated about the pivotal point of connection between the housing and the links, the resulting motion being merely a pivotal action between the driving elements at their pitch point.

In its application to the service of steering mechanism for tractors when used in connection with a trailing vehicle such as a binder, it is necessary that the tractor be turned to a greater angular position with relation to the binder than an angle of 90 degrees for the reason that when the sickle bar of the binder has finished its swath, it is necessary that the binder be so turned that the sickle bar will be moved backward while the binder is being turned to an extent which will cause it to again cut a full swath after rounding the corner, the result being, that in order to accomplish this, it is necessary that the tractor be turned a considerable amount beyond the right-angle turn so as to cause the binder to move backward on the side next the standing grain so that the sickle bar may be brought into the grain as previously described, the resulting angular relation between the tractor and the binder during such a turning movement being considerably greater than can be accommodated by the ordinary form of universal joints.

Having thus fully fully described my invention, I claim:

1. In a motion transmitting device the combination of a driving shaft, a driven shaft, a driving element carried by the adjacent ends of each shaft and each driving element in engagement with the other, a housing adjacent each driving element, and a connection between said housings having a pivotal point of attachment to one housing in line with the tangent to the circle of engagement between the driving elements on one side of the axis of one of the shafts and a pivotal point of connection to the other housing at the opposite side of said axis of the shaft.

2. In a motion transmitting device the combination of housings, shafts journaled therein, a gear on each shaft, a connection between said housings and pivotally connected to each thereof the pivotal mounting between the connection and one of said housings having an axis tangent to the pitch circle on one side of the axis of one of the shafts and the pivotal mounting between said connection and the other of said housings having an axis tangent to the pitch circle on the other side of the axis of said shaft, and means to confine the angular movement of the device to one or the other of the pivotal mountings.

3. In a tractor steering device the combination of a pair of housings, a pair of connecting members hingedly mounted at one end to one of said housings and at the other end to the other of said housings whereby when one of said housings is angled in one direction the movement will center at one of said hinged connections and whereby when said housing is angled in the opposite direction the movement will center about the other of said hinged connections, steering shafts mounted in said housings, and a gear on the end of each steering shaft and arranged with its pitch coincident with the axis of said hinged connections whereby when one of said housings is angled in either direction with relation to the other of said housings any rotary motion imparted to one of said shafts will be transmitted to the other thereof.

4. In a tractor steering device the combination of a pair of housings, connecting members hingedly mounted at one end to one of said housings and at the other end to the other thereof, a guide plate carried by one of said housings, a guiding member carried by the other housing and engaging said plate whereby said housing may have free movement on either of the hinging points of said connecting members but not on both simultaneously, steering shafts mounted in said housings, and gears on said shafts and have a tooth form whereby when one of said housings is angled with relation to the other thereof, said gears will remain in mesh to transmit motion from one shaft to the other.

5. In a motion transmitting device the combination of housings, shafts carried by said housings, driving gears carried by said shafts, a connection between said housings, said connection being pivoted to one of said housings in a line tangent to the pitch circle of said gears on one side of the center of one of the shafts and to the other housing in a corresponding line on the other side of said shaft center, and means to maintain said gears in mesh when the device is angled on either of the pivotal lines.

6. In a motion transmitting device the combination of a pair of housings, a shaft journaled in each housing, a gear on the end of each shaft, a compound pivotal connection between said housings, and a guide to shift the pivotal action from one pivotal point of the compound pivotal connection to the other as the angular relation of the axis of one shaft to the axis of the other crosses the axis of coincidence.

7. In a motion transmitting device the combination of a pair of housings, a shaft for each housing, a gear on each shaft, a link pivoted at one end to one housing in a line tangent to the pitch circle of the gears and at the other end to the other housing in a line tangent to the pitch circle of the gears, and a supporting lug carried by each housing for engaging said link at a point adjacent its pivotal connection to the other housing.

8. In a motion transmitting device the combination of a pair of housings, a shaft for each housing, a gear on each shaft, a link pivoted at one end to one housing in a line tangent to the pitch circle of the gears and at the other end to the other housing in a line tangent to the pitch circle of the gears, a supporting lug carried by each housing for engaging said link at a point adjacent its pivotal connection to the other housing, and a guide for confining the angular movement of the device to one of said pivotal connections at a time.

JOHN M. CUSTENBORDER.